(12) United States Patent
Nakano et al.

(10) Patent No.: US 11,656,087 B2
(45) Date of Patent: May 23, 2023

(54) INFORMATION PROCESSING APPARATUS, CONTROL METHOD OF INFORMATION PROCESSING APPARATUS, AND INFORMATION PROCESSING SYSTEM

(71) Applicant: TOYOTA JIDOSHA KABUSHIKI KAISHA, Toyota (JP)

(72) Inventors: Keiko Nakano, Kawasaki (JP); Yu Nagata, Nagoya (JP); Takashi Hayashi, Aichi-gun (JP); Ryota Kondo, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 369 days.

(21) Appl. No.: 16/925,505

(22) Filed: Jul. 10, 2020

(65) Prior Publication Data
US 2021/0010819 A1  Jan. 14, 2021

(30) Foreign Application Priority Data

Jul. 10, 2019  (JP) .............................. JP2019-128774

(51) Int. Cl.
*G01C 21/34*  (2006.01)
*A63F 13/45*  (2014.01)

(52) U.S. Cl.
CPC .......... *G01C 21/3484* (2013.01); *A63F 13/45* (2014.09); *G01C 21/3438* (2013.01)

(58) Field of Classification Search
None
See application file for complete search history.

(56) References Cited

U.S. PATENT DOCUMENTS

| | | | |
|---|---|---|---|
| 2003/0034873 A1* | 2/2003 | Chase | |
| 2014/0295963 A1 | 10/2014 | Ishikawa et al. | |
| 2016/0078577 A1* | 3/2016 | Michonski | |
| 2018/0211451 A1* | 7/2018 | Ashton | |
| 2020/0133306 A1* | 4/2020 | Chadha | ................ G05D 1/0088 |
| 2020/0197791 A1 | 6/2020 | Iwasaki et al. | |

FOREIGN PATENT DOCUMENTS

| | | | |
|---|---|---|---|
| JP | 2014-188010 A | | 10/2014 |
| JP | 2017-182317 A | | 10/2017 |
| KR | 20120100717 | * | 9/2012 |
| WO | 2018/230678 A1 | | 12/2018 |

OTHER PUBLICATIONS

Sneddon, Burn Rubber: The 10 Best Car Combat Games, Ranked, https://www.thegamer.com/best-car-combat-games-ever-ranked/#rollcage-stage-ii-pc-psx-2000 (Year: 2019).*

* cited by examiner

*Primary Examiner* — Aryan E Weisenfeld
(74) *Attorney, Agent, or Firm* — Oliff PLC

(57) ABSTRACT

An information processing apparatus, a control method for the information processing apparatus, and an information processing system which encourage a user to use a mobile object are provided. The information processing apparatus includes a communication interface and a controller. The communication interface receives actual usage for a plurality of mobile objects which are affiliated with one of a plurality of mobile object groups. The controller ranks the plurality of mobile object groups based on the actual usage.

6 Claims, 13 Drawing Sheets

*FIG. 4*

| MOBILE OBJECT ID | USER ID | TRAVEL DISTANCE (km) | USAGE TIME PERIOD (MINUTES) | USAGE FEE (YEN) |
|---|---|---|---|---|
| X01 | U01 | 10 | 20 | 500 |
| X01 | U02 | 15 | 27 | 700 |
| ... | ... | ... | ... | ... |

FIG. 8

| MOBILE OBJECT GROUP ID | MOBILE OBJECT GROUP NAME | REPRESENTATIVE IMAGE | AFFILIATED MOBILE OBJECT ID | | | | INFORMATION IN ACCORDANCE WITH RANK ORDER | | | SCORE | RANK ORDER |
|---|---|---|---|---|---|---|---|---|---|---|---|
| | | | | | | | FIRST PLACE | SECOND PLACE | THIRD PLACE | | |
| A | MOBILE OBJECT GROUP A | IMAGE A | X01 | X02 | X03 | X04 | IMAGE A1 | IMAGE A2 | IMAGE A3 | 999 | FIRST PLACE |
| B | MOBILE OBJECT GROUP B | IMAGE B | X05 | X06 | X07 | X08 | IMAGE B1 | IMAGE B2 | IMAGE B3 | 500 | THIRD PLACE |
| C | MOBILE OBJECT GROUP C | IMAGE C | X09 | X10 | X11 | X12 | IMAGE C1 | IMAGE C2 | IMAGE C3 | 650 | SECOND PLACE |
| ... | ... | ... | ... | ... | ... | ... | ... | ... | ... | ... | ... |

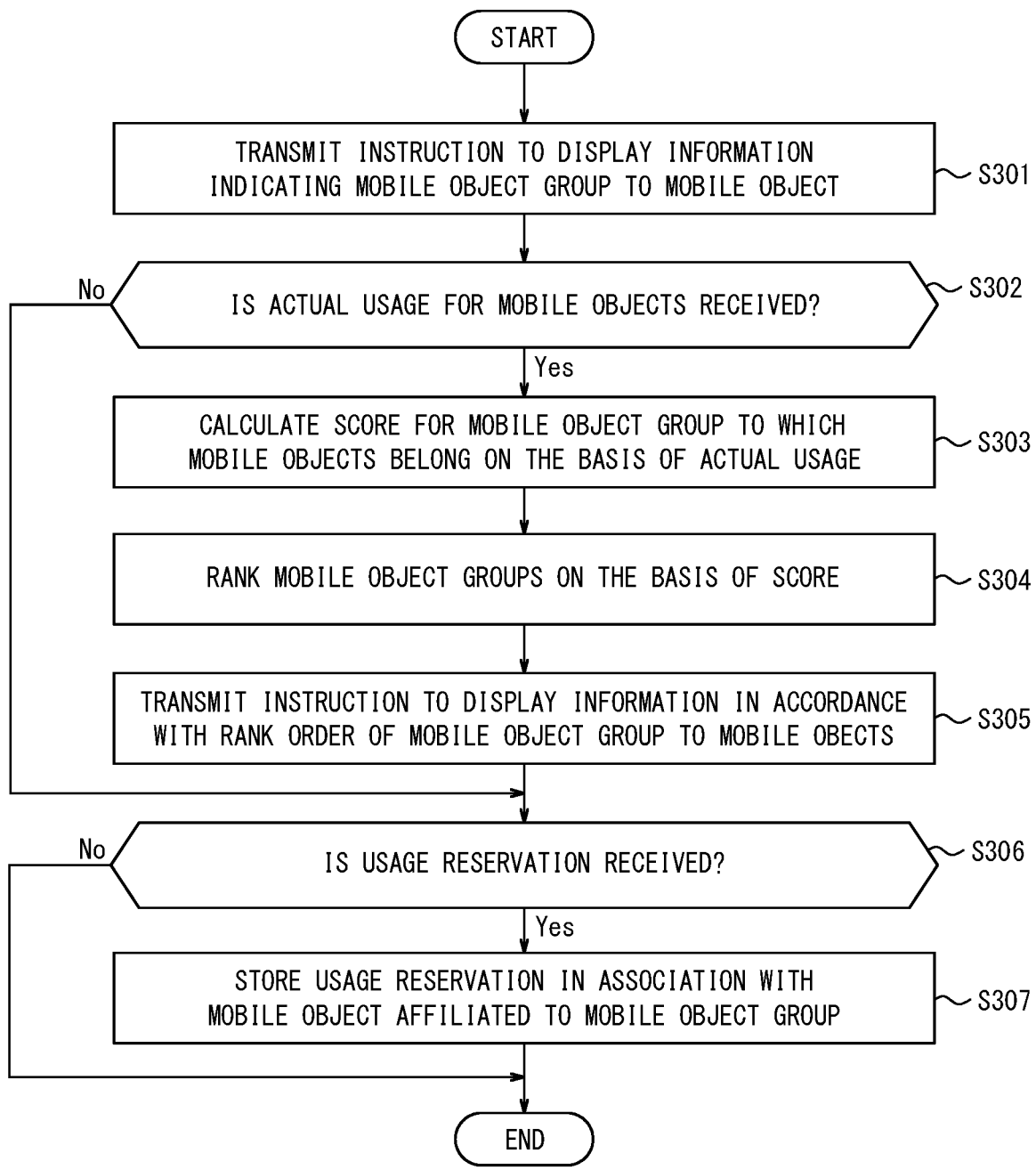

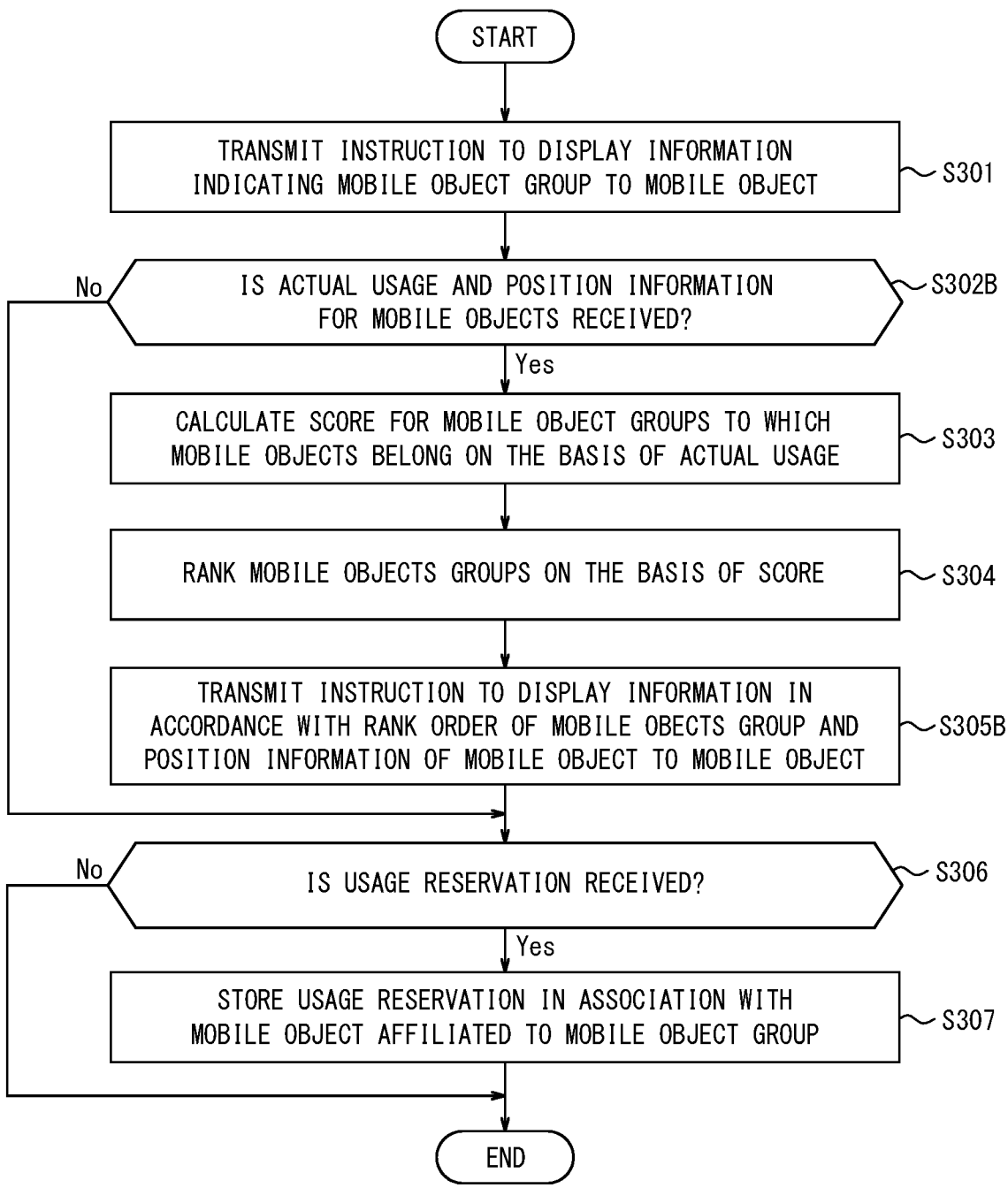

FIG. 11

| MOBILE OBJECT GROUP ID | MOBILE OBJECT GROUP NAME | REPRESENTATIVE IMAGE | AFFILIATED MOBILE OBJECT ID | | | | REGION | INFORMATION IN ACCORDANCE WITH RANK ORDER | | | SCORE | RANK ORDER |
|---|---|---|---|---|---|---|---|---|---|---|---|---|
| | | | | | | | | FIRST PLACE | SECOND PLACE | THIRD PLACE | | |
| A | MOBILE OBJECT GROUP A | IMAGE A | X01 | X02 | X03 | X04 | REGION X | IMAGE AX1 | IMAGE AX2 | IMAGE AX3 | 999 | FIRST PLACE |
| | | | | | | | REGION Y | IMAGE AY1 | IMAGE AY2 | IMAGE AY3 | | |
| B | MOBILE OBJECT GROUP B | IMAGE B | X05 | X06 | X07 | X08 | REGION X | IMAGE BX1 | IMAGE BX2 | IMAGE BX3 | 500 | THIRD PLACE |
| | | | | | | | REGION Y | IMAGE BY1 | IMAGE BY2 | IMAGE BY3 | | |
| C | MOBILE OBJECT GROUP C | IMAGE C | X09 | X10 | X11 | X12 | REGION X | IMAGE CX1 | IMAGE CX2 | IMAGE CX3 | 650 | SECOND PLACE |
| | | | | | | | REGION Y | IMAGE CY1 | IMAGE CY2 | IMAGE CY3 | | |
| ... | ... | ... | ... | ... | ... | ... | ... | ... | ... | ... | ... | ... |

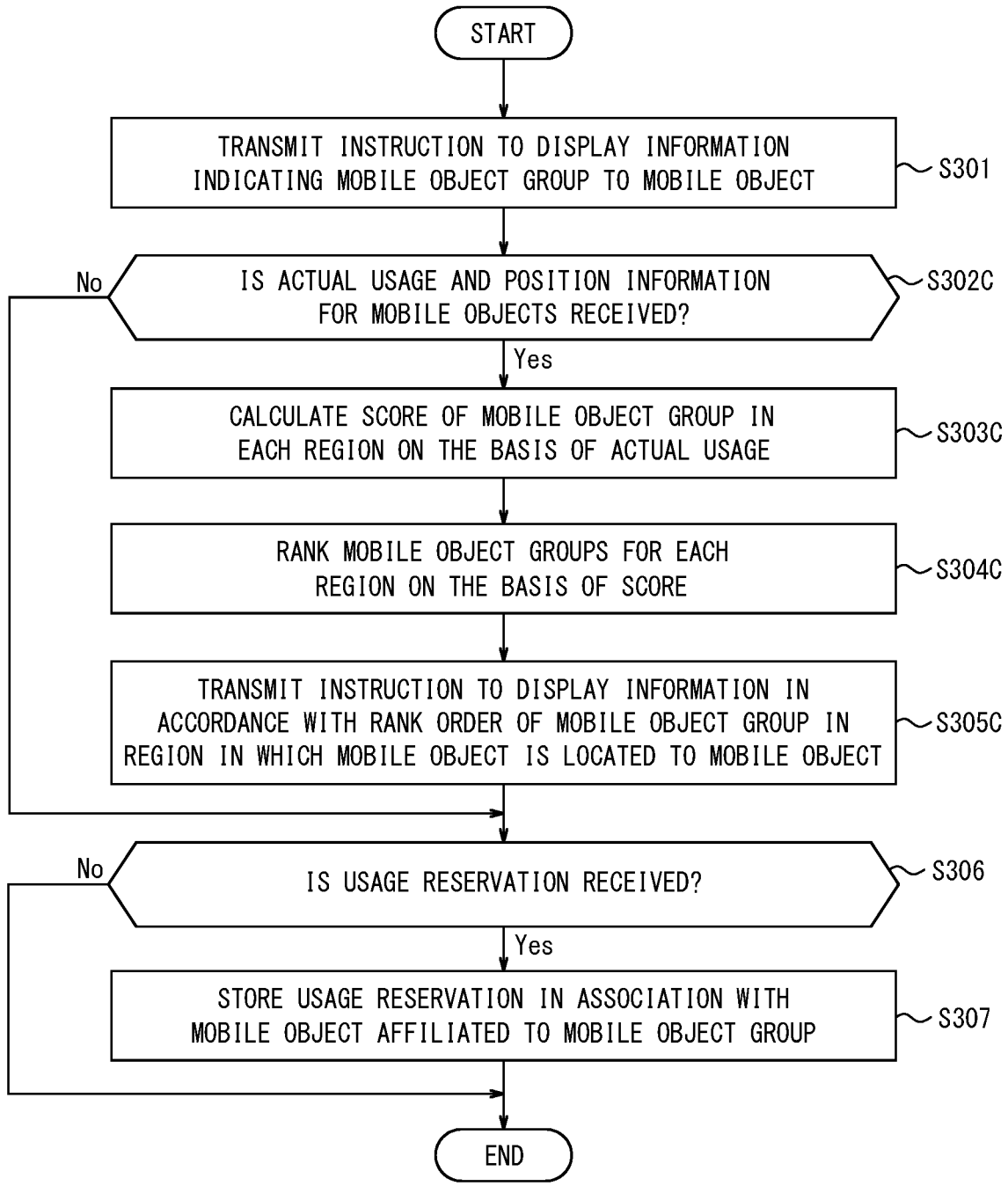

FIG. 13

| MOBILE OBJECT GROUP ID | MOBILE OBJECT GROUP NAME | REPRESENTATIVE IMAGE | AFFILIATED MOBILE OBJECT ID | | | | INFORMATION IN ACCORDANCE WITH RANK ORDER | | | |
|---|---|---|---|---|---|---|---|---|---|---|
| | | | | | | | FIRST PLACE | REGION | SCORE | RANK ORDER |
| A | MOBILE OBJECT GROUP A | IMAGE A | X01 | X02 | X03 | X04 | IMAGE A1 | REGION X | 999 | FIRST PLACE |
| | | | | | | | | REGION Y | 200 | THIRD PLACE |
| B | MOBILE OBJECT GROUP B | IMAGE B | X05 | X06 | X07 | X08 | IMAGE B1 | REGION X | 500 | THIRD PLACE |
| | | | | | | | | REGION Y | 400 | SECOND PLACE |
| C | MOBILE OBJECT GROUP C | IMAGE C | X09 | X10 | X11 | X12 | IMAGE C1 | REGION X | 650 | SECOND PLACE |
| | | | | | | | | REGION Y | 500 | FIRST PLACE |
| ... | ... | ... | ... | ... | ... | ... | ... | ... | ... | ... |

INFORMATION PROCESSING APPARATUS, CONTROL METHOD OF INFORMATION PROCESSING APPARATUS, AND INFORMATION PROCESSING SYSTEM

CROSS-REFERENCE TO RELATED APPLICATION

The present application claims priority to Japanese Patent Application No. 2019-128774 filed on Jul. 10, 2019, the entire disclosure of which is incorporated herein by reference.

TECHNICAL FIELD

The present disclosure relates to an information processing apparatus, a control method for the information processing apparatus, and an information processing system.

BACKGROUND

Conventionally, techniques which utilize the actual usage of mobile objects are known. For example, JP 2014-188010 A (PTL 1) describes a game system in which travelling of a vehicle, or the like, in the real world is utilized in progress of a game.

CITATION LIST

Patent Literature

PTL 1: JP 2014-188010 A

SUMMARY

However, conventional techniques which utilize actual usage of mobile objects have room for improvement. For example, in techniques which utilize actual usage of mobile objects, it is desired to further encourage users to use the mobile objects.

An object of the present disclosure which has been made in view of such circumstances is to provide an information processing apparatus, a control method for the information processing apparatus, and an information processing system, which encourage users to use mobile objects.

An information processing apparatus according to an embodiment of the present disclosure includes a communication interface configured to receive actual usage for a plurality of mobile objects which are affiliated to one of a plurality of mobile object groups, and a controller configured to rank the plurality of mobile object groups based on the actual usage.

A control method for an information processing apparatus according to an embodiment of the present disclosure includes receiving, by the information processing apparatus, actual usage for a plurality of mobile objects which are affiliated to one of a plurality of mobile object groups, and ranking, by the information processing apparatus, the plurality of mobile object groups based on the actual usage.

An information processing system according to an embodiment of the present disclosure including a plurality of mobile objects which are affiliated to one of a plurality of mobile object groups, and a server which can perform communication with the plurality of mobile objects, the respective mobile objects are configured to transmit actual usage for the respective mobile objects to the server, and the server is configured to rank the plurality of mobile object groups based on the actual usage.

According to the information processing apparatus, the control method of the information processing apparatus, and the information processing system according to the embodiment of the present disclosure, it is possible to encourage a user to use the mobile objects.

BRIEF DESCRIPTION OF THE DRAWINGS

In the accompanying drawings:

FIG. 4 is a diagram illustrating an example of actual usage for a plurality of mobile objects;

FIG. 8 is a view illustrating an example of information, scores and rankings relating to a plurality of mobile object groups;

FIG. 9 is a flowchart illustrating processing by the server included in the information processing system;

FIG. 10 is a flowchart illustrating processing by a server in a modified example of an embodiment of the present disclosure;

FIG. 11 is a diagram illustrating an example of information, scores and rankings relating to a plurality of mobile object groups in the modified example of an embodiment of the present disclosure;

FIG. 12 is a flowchart illustrating processing by a server in another modified example of an embodiment of the present disclosure; and FIG. 13 is a view illustrating an example of information, scores and ranking relating to a plurality of mobile object groups in another modified example of an embodiment of the present disclosure.

DETAILED DESCRIPTION

Figure 1:
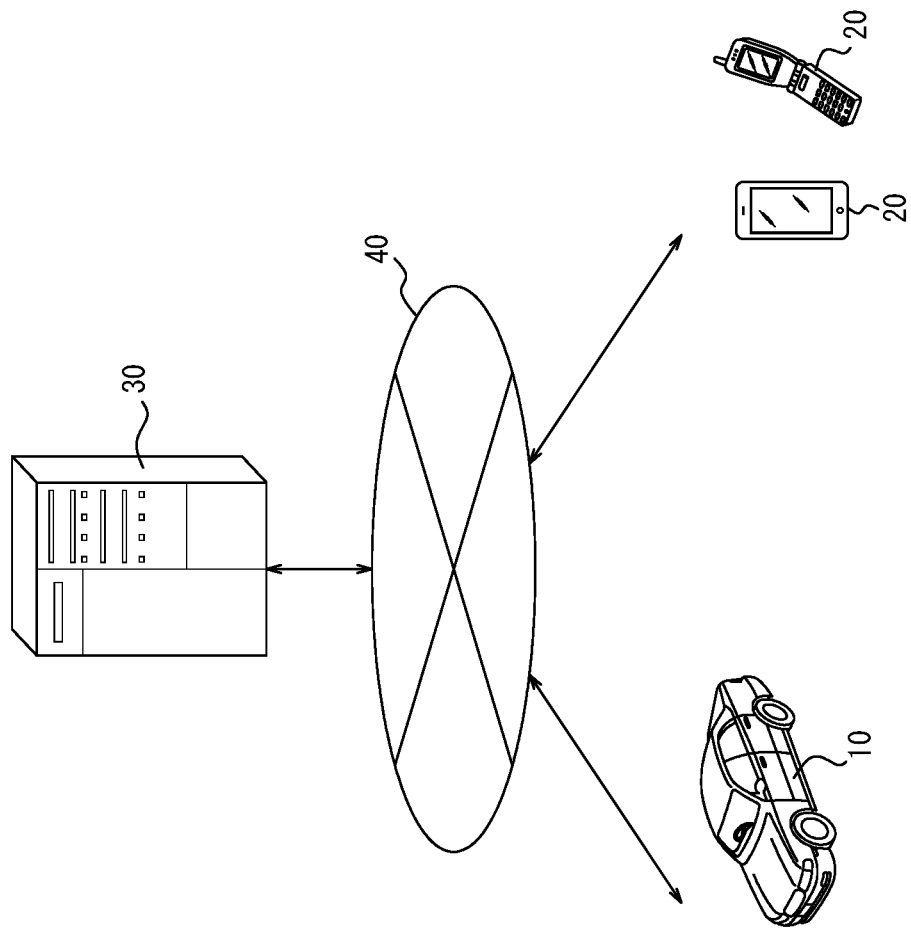
FIG. 1 is a diagram illustrating a schematic configuration of an information processing system according to an embodiment of the present disclosure.

An embodiment of the present disclosure will be described below with reference to the drawings.

In each of the drawings, the same reference numerals are assigned to the same or corresponding portions. In the description of the present embodiments, description of the same or corresponding portions will be omitted or simplified as appropriate.

Information Processing System Configuration

An outline of an information processing system 1 according to an embodiment of the present disclosure will be described with reference to FIG. 1. The information processing system 1 includes a mobile object 10, a terminal apparatus 20 and a server 30.

The mobile object 10 is an object which moves according to use by a user. Use by the user may include forms of use such as, for example, forms in which a user rides as a passenger, and forms in which luggage is carried by the mobile object at the request of a user. The mobile object 10 is, for example, a vehicle in which the user rides, such as an on-demand bus, a hire car, a shared car or a taxi, but may be a vehicle in which the user cannot normally ride, such as a truck. In the present embodiment, the mobile object 10 will be described on the assumption that it is a land vehicle. However, the mobile object 10 is not limited to a land vehicle, and may be an airplane, a helicopter, a drone, or the like. In the present embodiment, the mobile object 10 may be driven by a driver, or driving may be automated at any appropriate level. The level of automation is, for example, one of level 1 to level 5 as classified by the SAE (Society of Automotive Engineers).

The terminal apparatus 20 is, for example, a mobile phone, a smartphone, or the like, but may also be any appropriate information processing apparatus such as a personal computer. The server 30 includes one or a plurality of server apparatuses which can perform communication with each other, but may also include any appropriate information processing apparatus. The mobile object 10, the terminal apparatus 20 and the server 30 can respectively perform communication with each other via a network 40. In FIG. 1, two mobile objects 10, two terminal apparatuses 20 and one server 30 are illustrated to simplify the description, but the information processing system 1 may include any number of mobile objects 10, terminal apparatuses 20, and servers 30.

The network 40 is any appropriate communication network through which the mobile object 10, the terminal apparatus 20 and the server 30 can perform communication with each other. The network 40 may be a wireless or wired transmission path, and may be a communication network such as the Internet. For example, the network 40 in the present embodiment includes, an ad hoc network, a MAN (Metropolitan Area Network), a cellular network, a WPAN (Wireless Personal Area Network), a PSTN (Public Switched Telephone Network), a terrestrial wireless network, an optical network, other networks, or a combination thereof. Components of the wireless network include, for example, an access point (for example, a Wi-Fi access point), a femto cell, or the like. Further, wireless communication equipment can be connected to a wireless network using Wi-Fi® (Wi-Fi is a registered trademark in Japan, other countries, or both), Bluetooth® (Bluetooth is a registered trademark in Japan, other countries, or both), a cellular communication technique, or other wireless techniques and technical standards.

Next, each component of the information processing system 1 will be described in detail.

Mobile Object Configuration

Figure 2:
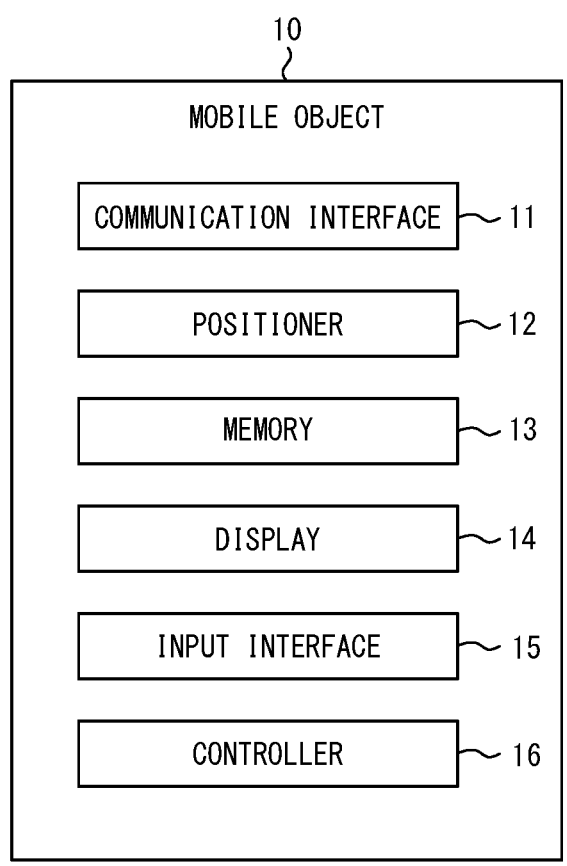
FIG. 2 is a block diagram illustrating a schematic configuration of a mobile object included in the information processing system.

A configuration of the mobile object 10 in the information processing system 1 will be described in detail. As illustrated in the block diagram of FIG. 2, the mobile object 10 includes a communication interface 11, a positioner 12, a memory 13, a display 14, an input interface 15, and a controller 16. The communication interface 11, the positioner 12, the memory 13, the display 14, the input interface 15 and the controller 16 may be respectively incorporated into the mobile object 10, or may be detachably provided to the mobile object 10. In a case in which they are detachably provided to the mobile object 10, the communication interface 11, the positioner 12, the memory 13, the display 14, the input interface 15 and the controller 16 may be respectively provided to an information processing apparatuses, such as a car navigation apparatus, which can be attached to and detached from the mobile object 10. The communication interface 11, the positioner 12, the memory 13, the display 14, the input interface 15 and the controller 16 are connected so as to be able to perform communication with each other via, for example, an in-vehicle network such as a CAN (Controller Area Network) or a leased line.

The communication interface 11 includes a communication module to be connected to the network 40. The communication module may be a communication module which supports mobile object communication standards such as, for example, 4G (4th Generation) and 5G (5th Generation). For example, in-vehicle communication equipment such as a DCM (Data Communication Module) may function as the communication interface 11. In the present embodiment, the mobile object 10 is connected to the network 40 via the communication interface 11. Thus, the mobile object 10 can communicate with the server 30, or the like.

The positioner 12 includes a receiver which supports a satellite positioning system. The satellite positioning system supported by the receiver may be, for example, a GPS (Global Positioning System). Further, the positioner 12 may include, for example, an acceleration sensor, a gyro sensor, or the like. For example, a car navigation apparatus may function as the positioner 12. Thus, the positioner 12 acquires position information for the mobile object 10. In the present embodiment, the "position information" for the mobile object 10 is information from which a position of the mobile object 10 can be specified. The position information for the mobile object 10 may include, for example, at least one of a coordinate, speed, a travel path, a travel distance of the mobile object 10, or change amounts and rates of change thereof, or the like. The position information for the mobile object 10 acquired by the positioner 12 may be transmitted to the server 30 via the communication interface 11. Thus, the server 30 can identify the position of the mobile object 10.

The memory 13 may be, for example, a semiconductor memory, a magnetic memory, an optical memory, or the like. The memory 13 may function as, for example, a main storage, an auxiliary storage or a cache memory. The memory 13 stores information to be used for operation of the mobile object 10. For example, the memory 13 may store a system program, an application program, built-in software, or the like. The information stored in the memory 13 may be updated with, for example, information acquired from the network 40 via the communication interface 11.

The memory 13 may store, for example, mobile object identification information which uniquely identifies the mobile object 10. The mobile object identification information is also referred to as a mobile object ID (Identifier). The mobile object ID is, for example, information issued by the server 30, but may also be information such as a vehicle identification number or an automobile registration number of the mobile object 10.

Further, the memory 13 may store, for example, mobile object group identification information which uniquely identifies a mobile object group to which the mobile object 10 is affiliated. The mobile object group identification information is also referred to as a mobile object group ID. The mobile object group ID may be, for example, information issued by the server 30.

The memory 13 may further store actual usage for the mobile object 10. The actual usage for the mobile object 10 includes information which quantitatively expresses usage of the mobile object 10 by the user. For example, the actual usage for the mobile object 10 may include at least one of information regarding a travel distance of the mobile object 10 and information regarding a usage time period. The information regarding the travel distance includes, for example, information which quantitatively expresses a distance the mobile object 10 moves by usage by the user, such as a coordinate expressing the position of the mobile object 10, a usage start point, a usage end point, a travel path, a distance and speed. The information regarding the usage time period includes, for example, information which quantitatively expresses a time period during which the mobile object 10 is used by the user, such as usage start time, usage end time and an elapsed time period. The actual usage is not limited to the information regarding the travel distance and the information regarding the usage time period, and may include, for example, information which quantitatively expresses usage of the mobile object 10 by the user, such as the number of passengers, the number of pieces of baggage and weight of baggage, and a usage fee.

The display 14 displays information as an image, or the like. In the present embodiment, the "image" includes text, a still image, a moving image, color, or the like. The display 14 is, for example, a display monitor, but the display may also be any appropriate display apparatus such as an electronic message board. The display 14 may be provided facing outward from the mobile object 10 or may be provided facing inward to the mobile object 10. The display 14 displays, for example, information regarding the mobile object group to which the mobile object 10 is affiliated, information in accordance with a ranking of the mobile object group to which the mobile object 10 is affiliated, or the like.

The input interface 15 accepts input operations from the user. The input interface 15 is, for example, a touch panel, but the input interface 15 may also be any appropriate input apparatus such as a camera, a microphone or an IC card reader. When the input interface 15 accepts an input operation by the user, the input interface 15 converts the input operation into electrical information. For example, the input interface 15 may accept operation of inputting user identification information which uniquely specifies the user of the mobile object 10. The user identification information is also referred to as a user ID. The user ID is, for example, information issued by the server 30, but may also be information such as biological information of the user.

The controller 16 includes one or more processors. The controller 16 may respectively control the above-described communication interface 11, positioner 12, memory 13, display 14 and input interface 15 to realize functions thereof. For example, an ECU (Electronic Control Unit) mounted on the mobile object 10 may function as the controller 16. In the present embodiment, the "processor" may be a general-purpose processor, a dedicated processor which is dedicated to particular processing, or the like.

Figure 3:
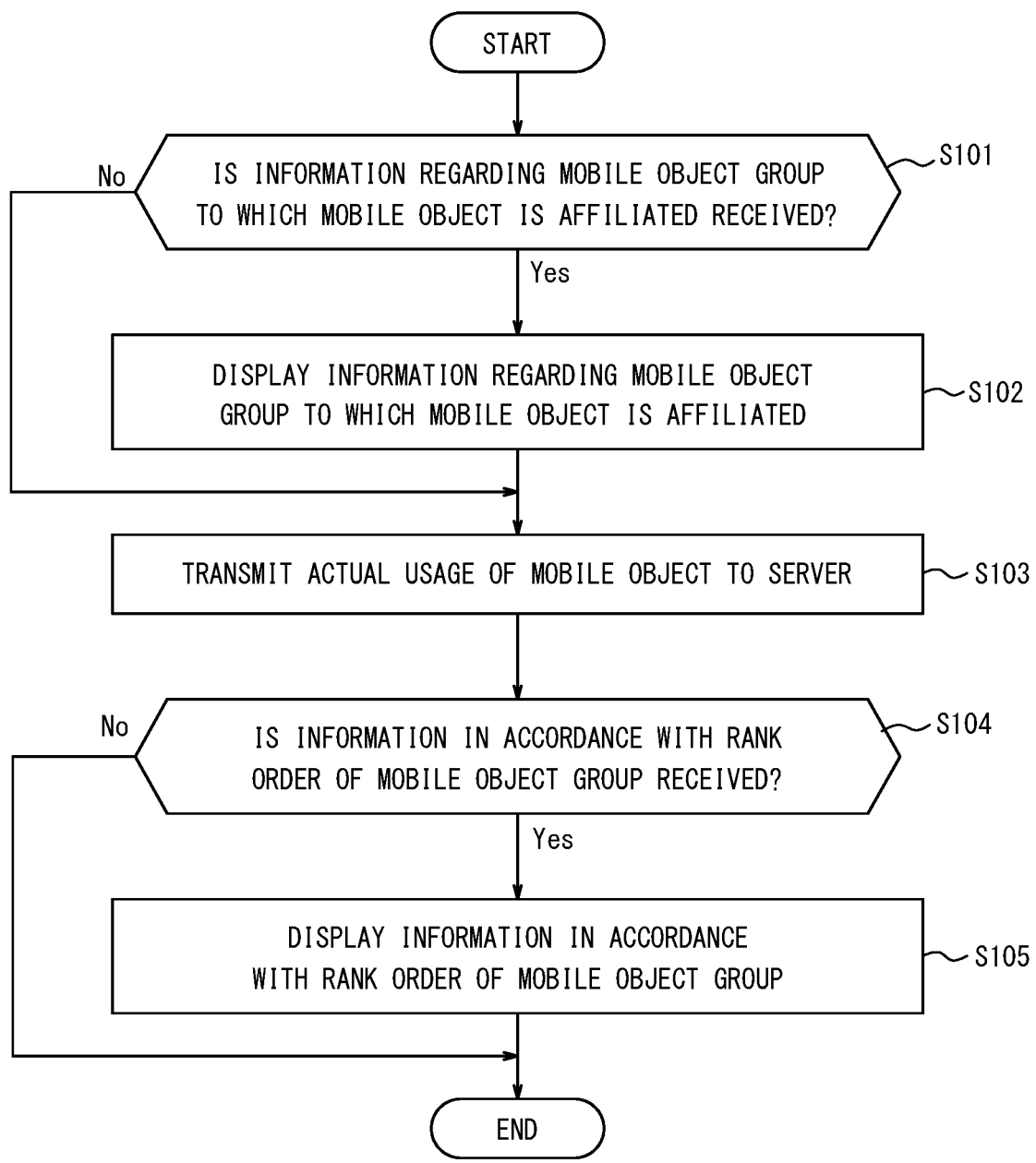
FIG. 3 is a flowchart illustrating processing by the mobile object included in the information processing system.

Operations of the mobile object 10, which are to be realized by each function of the mobile object 10 being controlled by the controller 16, will be described with reference to FIG. 3. The operations of the mobile object 10 correspond to a control method for the mobile object 10.

In step S101, the mobile object 10 receives information regarding the mobile object group to which the mobile object 10 is affiliated.

Specifically, the controller 16 receives the information regarding the mobile object group to which the mobile object 10 is affiliated via the communication interface 11. The controller 16 may receive the information regarding the mobile object group to which the mobile object 10 is affiliated from, for example, the server 30. The controller 16 causes the received information regarding the mobile object group to which the mobile object 10 is affiliated to be stored in the memory 13. In a case in which the controller 16 does not receive the information regarding the mobile object group to which the mobile object 10 is affiliated (step S101: No), the controller 16 may execute processing in step S103 without performing processing in step S102.

The "information regarding the mobile object group" may include, for example, information from which the user of the mobile object 10 can uniquely identify the mobile object group to which the mobile object 10 is affiliated, such as a name, an image, a URL, a one-dimensional code or a two-dimensional code for the mobile object group. For example, in a case in which the mobile object group is associated with an idol, a character, or the like, the information regarding the mobile object group may include the name or an image of the idol, the character, or the like. In the present embodiment, the mobile object 10 will be described assuming that the information regarding the mobile object group is received from the server 30, but the corresponding information may be stored in the memory 13 in advance.

In step S102, the mobile object 10 displays the information regarding the mobile object group to which the mobile object 10 is affiliated.

Specifically, the controller 16 may cause the information regarding the mobile object group to which the mobile object 10 is affiliated, stored in the memory 13, to be displayed by the display 14.

In step S103, the mobile object 10 transmits the actual usage for the mobile object 10 to the server 30.

Specifically, the controller 16 generates the actual usage for the mobile object 10. The actual usage includes, as descried above, information which quantitatively expresses usage of the mobile object 10 by the user. For example, as illustrated in FIG. 4, the actual usage may include a mobile object ID for uniquely specifying the mobile object 10, a user ID which uniquely specifies the user, and a travel distance, a usage time period and a usage fee as information which quantitatively expresses usage of the mobile object 10 by the user. The controller 16 may continuously measure position information for the mobile object 10 using the positioner 12, and calculate a travel distance from a start point to an end point for the usage by the user. The controller 16 may calculate a usage time period from a start time until an end time for the usage by the user. Alternatively, the controller 16 may calculate a usage fee from the travel distance, the usage time period, or the like. The controller 16 causes the generated actual usage to be stored in the memory 13. Further, the actual usage is not limited to the above-described examples, and may include information such as the mobile object group ID.

The controller 16 transmits the actual usage for the mobile object 10 to the server 30 via the communication interface 11 at a predetermined timing. In the present embodiment, the "predetermined timing" is repeated at a fixed time interval, but the predetermined timing may be repeated at a variable time interval, or may occur only once without being repeated. The "predetermined timing" may include one or a plurality of timings such as a timing at which the usage by the user has finished, a timing at which a predetermined amount of actual usage is stored in the memory 13, and a timing at which acceleration, deceleration, stopping, or the like, of the mobile object 10 is detected. Further, in a case in which the predetermined timing includes a plurality of timings, the respective timings may be regularly repeated or may be irregularly repeated.

In step S104, the mobile object 10 receives information in accordance with the ranking of the mobile object group.

Specifically, the controller 16 receives the information in accordance with the ranking of the mobile object group via the communication interface 11. The controller 16 may receive the information in accordance with the ranking of the mobile object group from, for example, the server 30. The controller 16 causes the received information in accordance with the ranking of the mobile object group to be stored in the memory 13. In a case where the information in accordance with the ranking of the mobile object group is not received (step S104: No), the controller 16 may finish the present processing without performing processing in step S105.

The "information in accordance with the ranking" may be, for example, information whose quantity is different in accordance with the ranking or whose value such as a rarity level and price is different in accordance with the ranking. While the information in accordance with the ranking includes, for example, an image, the information may include information such as a URL, a one-dimensional code and a two-dimensional code. For example, in a case in which each of the mobile object groups is associated with an idol, a character, or the like, the information in accordance with the ranking may be an image of the idol, the character, or the like, with a higher rarity level as the ranking is higher. In the present embodiment, the mobile object 10 is described assuming that the information in accordance with the ranking is received from the server 30, but the information may be stored in the memory 13 in advance.

In step S105, the mobile object 10 displays the information in accordance with the ranking of the mobile object group.

Specifically, the controller 16 displays the information in accordance with the ranking of the mobile object group stored in the memory 13 at the display 14.

Terminal Apparatus Configuration

Figure 5:
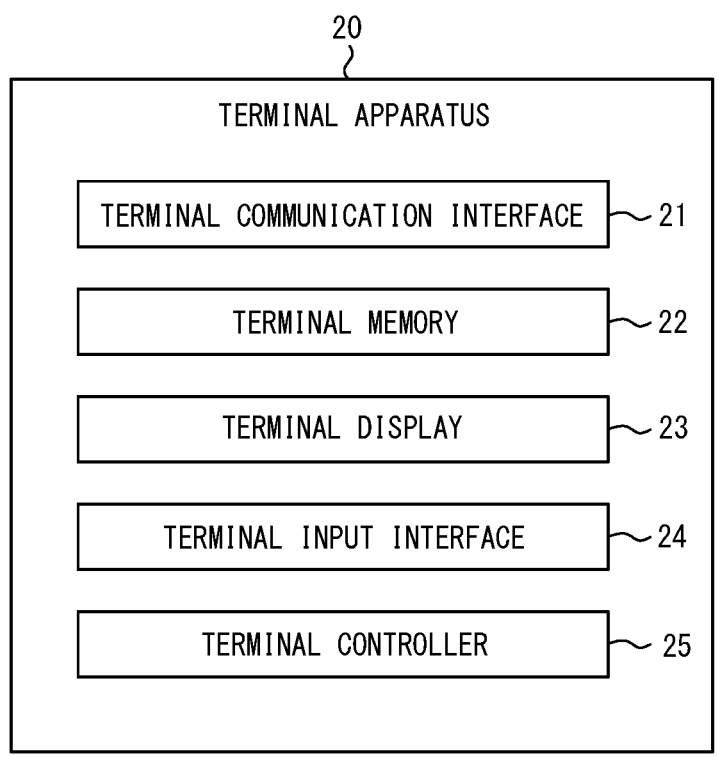
FIG. 5 is a block diagram illustrating a schematic configuration of a terminal apparatus included in the information processing system.

A configuration of the terminal apparatus 20 in the information processing system 1 will be described in detail. As illustrated in the block diagram of FIG. 5, the terminal apparatus 20 includes a terminal communication interface 21, a terminal memory 22, a terminal display 23, a terminal input interface 24 and a terminal controller 25. The terminal communication interface 21, the terminal memory 22, the terminal display 23, the terminal input interface 24 and the terminal controller 25 are connected in a wired or wireless manner so as to be able to communicate.

The terminal communication interface 21 includes a communication module to be connected to the network 40. The communication module may be a communication module which supports mobile communication standards such as, for example, 4G and 5G. In the present embodiment, the terminal apparatus 20 is connected to the network 40 via the terminal communication interface 21. Thus, the terminal apparatus 20 can communicate with the server 30, or the like.

The terminal memory 22 may be, for example, a semiconductor memory, a magnetic memory, an optical memory, or the like. The terminal memory 22 may function as, for example, a main storage, an auxiliary storage or a cache memory. The terminal memory 22 stores information to be used for operation of the terminal apparatus 20. For example, the terminal memory 22 may store a system program, an application program, built-in software, or the like. The information stored in the terminal memory 22 may be updated, for example, with information acquired from the network 40 via the terminal communication interface 21.

The terminal memory 22 may store, for example, the above-described user identification information.

The terminal display 23 displays information as an image, or the like. The terminal display 23 is, for example, a display monitor, but may also be any appropriate display apparatus. The terminal display 23 may display, for example, information regarding the mobile object group, a usage reservation procedure which designates the mobile object group, or the like.

The terminal input interface 24 accepts input operations from the user. While the terminal input interface 24 is, for example, a touch panel, the terminal input interface 24 may be any appropriate input apparatus such as a camera, a microphone or an IC card reader. When the terminal input interface 24 accepts an input operation by the user, the terminal input interface 24 converts the input operation into electrical information. For example, the terminal input interface 24 may accept operation of inputting a usage reservation which designates the mobile object group.

The terminal controller 25 includes one or more processors. The terminal controller 25 may respectively control the above-described terminal communication interface 21, terminal memory 22, terminal display 23 and terminal input interface 24 to realize their respective functions.

Figure 6:
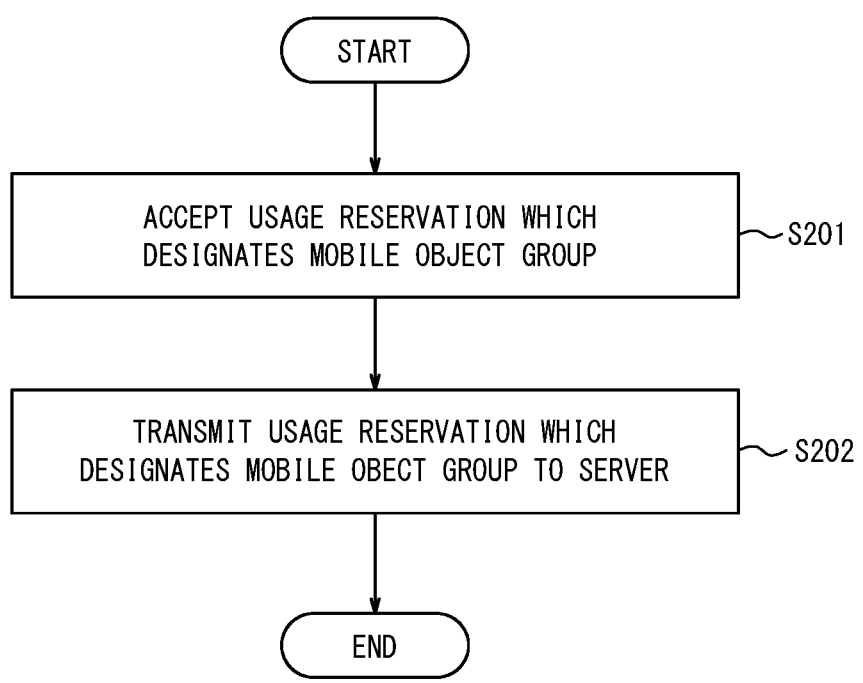
FIG. 6 is a flowchart illustrating processing by the terminal apparatus included in the information processing system.

Operations of the terminal apparatus 20, which are realized by each function of the terminal apparatus 20 being controlled by the terminal controller 25, will be described with reference to FIG. 6. The operations of the terminal apparatus 20 correspond to a control method for the terminal apparatus 20.

In step S201, the terminal apparatus 20 accepts a usage reservation which designates the mobile object group according to an input from the user.

Specifically, the terminal controller 25 accepts the usage reservation which designates the mobile object group according to an input from the user via the terminal input interface 24. The usage reservation includes a mobile object group ID, for example, but may also include information such as a mobile object ID, which directly or indirectly designates the mobile object group. The usage reservation may further include information to be used for reserving the mobile object 10, such as, for example, a user ID, an intended use of the mobile object 10 and a usage time period. In a case in which the terminal controller 25 does not accept the usage reservation designating the mobile object group, the terminal controller 25 may continue processing to accept inputs from the user.

In step S202, the terminal apparatus 20 transmits the usage reservation which designates the mobile object group, to the server 30.

Specifically, the terminal controller 25 transmits the usage reservation which designates the mobile object group to the server 30 via the terminal communication interface 21 at a predetermined timing.

Server Configuration

Figure 7:
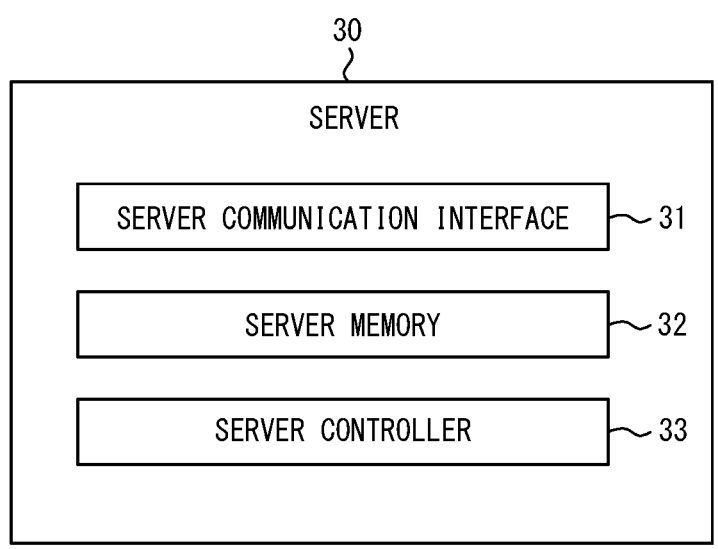
FIG. 7 is a block diagram illustrating a schematic configuration of a server included in the information processing system.

As illustrated in a block diagram in FIG. 7, the server 30 includes a server communication interface 31, a server memory 32 and a server controller 33. The server communication interface 31, the server memory 32 and the server controller 33 are connected in a wired or wireless manner so as to be able to perform communication.

The server communication interface 31 includes a communication module to be connected to the network 40. The communication module may be a communication module which supports standards such as, for example, those associated with a wired LAN (Local Area Network) and/or a wireless LAN. In the present embodiment, the server 30 is connected to the network 40 via the server communication interface 31. Thus, the server 30 can communicate with the mobile object 10 and the terminal apparatus 20.

The server memory 32 may be, for example, a semiconductor memory, a magnetic memory, an optical memory, or the like. The server memory 32 may function as, for example, a main storage, an auxiliary storage or a cache memory. The server memory 32 stores information to be used for operation of the server 30. For example, the server memory 32 may store a system program, an application program, a database, or the like. The information stored in the server memory 32 may be updated, for example, with information acquired from the network 40 via the server communication interface 31.

The server memory 32 may store, for example, the mobile object ID which uniquely identifies the mobile object 10, the user ID which uniquely identifies the user, and the mobile object group ID which uniquely identifies the mobile object group, as described above. The server memory 32 may store information regarding the mobile object 10, such as a vehicle type, a maximum number of passengers, a maximum load, and a usage reservation status of the mobile object 10, in association with the mobile object ID of the mobile object 10. Further, the server memory 32 may store information regarding the user, such as the user's name, billing address, bank account and/or credit card information, in association with the user ID of the user. Thus, the server 30 can perform processing such as accepting of a usage reservation of the mobile object 10 from the user and billing of a fee to the user.

Further, for example, the server memory 32 stores information regarding each of a plurality of mobile object groups to which one or more mobile objects 10 are affiliated. Specifically, as illustrated in FIG. 8, the server memory 32 may store the information regarding the mobile object group, such as mobile object group name, a representative image, affiliated mobile object IDs, and information in accordance with the ranking, in association with the mobile object group ID. For example, in a case in which the mobile object group is associated with an idol, a character, or the like, the mobile object group name, the representative image, the information in accordance with the ranking, or the like, may be a name or an image of the idol, the character, or the like.

The affiliated mobile object IDs are the mobile object IDs of the mobile objects which are affiliated to each mobile object group. In other words, one or more mobile object IDs are associated with one mobile object group ID as the affiliated mobile object IDs. The server 30 determines that the mobile object 10 is affiliated with the mobile object group from the mobile object ID being associated with the mobile object group ID. While, in FIG. 8, four mobile object IDs are associated with each mobile object group ID, respectively, a different number of mobile object IDs may be associated with one mobile object group ID.

As described above, the information in accordance with the ranking may be information whose number, an amount or value such as a rarity level and price is different in accordance with the ranking. The information in accordance with the ranking includes, for example, an image, but may also include information such as a URL, a one-dimensional code and a two-dimensional code. In FIG. 8, for one mobile object group ID, three images are associated which are to be respectively displayed in cases in which the ranking of the respective mobile objects is a first position, a second position and a third position.

The server memory 32 further stores a score and ranking respectively associated with each of a plurality of mobile object groups. As illustrated in FIG. 8, the server 30 may store scores and ranking in association with the respective mobile object group IDs. The score includes numerical value information which allows quantitative comparison when ranking the mobile object groups, which will be described later. While, in FIG. 8, one piece of numerical value information is included in the score and the ranking, any quantity of numerical value information may be included.

The server controller 33 includes one or more processors. The server controller 33 may respectively control the above-described server communication interface 31 and server memory 32 to realize the functions thereof.

Operations of the server 30, which are to be realized by each function of the server 30 being controlled by the server controller 33, will be described with reference to FIG. 9. The operation of the server 30 corresponds to a control method for the server 30.

In step S301, the server 30 causes each of the mobile objects 10 to display the information indicating the mobile object group to which the respective mobile object 10 is affiliated.

Specifically, the server controller 33 transmits an instruction to display the information indicating the mobile object group to which the mobile object 10 is affiliated to the mobile object 10 via the server communication interface 31 at a predetermined timing. For example, the predetermined timing may be a timing at which a power source such as an engine of the mobile object 10 is started. The mobile object 10 which receives the instruction to display the information indicating the mobile object group to which the mobile object 10 is affiliated, can display the information indicating the mobile object group to which the mobile object 10 is affiliated on the display 14.

The instruction to display the information indicating the mobile object group may or may not include the information which is to be displayed by the mobile object 10. For example, it is assumed that the mobile object 10 is affiliated to a mobile object group A, as illustrated in FIG. 8. The mobile object 10 may store an image A which is a representative image of the mobile object group A in advance. In such a case, the server controller 33 may transmit a mobile object group ID of the mobile object group A as the instruction to display the information indicating the mobile object group A, to the mobile object 10. Meanwhile, in a case in which the mobile object 10 does not store the image A, the server controller 33 may transmit the image A to the mobile object 10 as the instruction to display the information indicating the mobile object group A.

In step S302, the server 30 receives actual usage for a plurality of mobile objects 10 affiliated with one of the plurality of mobile object groups.

Specifically, the server controller 33 receives the actual usage of the mobile objects 10 via the server communication interface 31. The server controller 33 may, for example, receive the actual usage of the mobile objects 10 from the respective mobile objects 10. In a case in which the server controller 33 does not receive the actual usage of the mobile objects 10 (step S302: No), the server controller 33 may execute processing in step S306 without performing processing from step S303 to step S305.

In step S303, the server 30 calculates each score for the mobile object group on the basis of the actual usage.

Specifically, in a case in which the server controller 33 receives the actual usage for the mobile objects 10, the server controller 33 calculates a score for the mobile object group to which the mobile objects 10 are affiliated on the basis of the actual usage. The server controller 33 specifies the mobile object group to which the mobile objects 10 are affiliated, for example, on the basis of the mobile object IDs included in the actual usage for the mobile objects 10. The server controller 33 calculates a score for the specified mobile object group on the basis of information which quantitatively expresses usage of the mobile objects 10 by the users included in the actual usage. For example, the server controller 33 may calculate a score using travel distances, usage time periods or usage fees included in the actual usage directly. Alternatively, the server controller 33 may calculate a score by performing predetermined calculation processing on the information included in the actual usage. For example, in a case in which the server controller 33 receives the actual usage for the mobile objects 10, the server controller 33 may calculate the number of times that the mobile objects 10 have been used on the basis of the actual usage. The server controller 33 may calculate the total number of times that the mobile objects 10 which are affiliated to each of the mobile object groups on the basis of the number of times that the mobile objects 10 have been used. The server controller 33 may calculate a score for the mobile object group on the basis of the total number of times of usage. Thus, even in a case in which the mobile object 10 which transmits a travel distance, the mobile object 10 which transmits a usage time period, and the mobile object 10 which transmits a usage fee as the actual usage are mixed in the information processing system 1, the server controller 33 can calculate and manage the score in an integrated manner with the number of times of usage. The server controller 33 may store the calculated score of the mobile object group in the server memory 32. In a case in which the score of the target mobile object group has already been stored in the server memory 32, the server controller 33 may update the score through addition of the calculated score to the stored score, or the like.

In step S304, the server 30 ranks the plurality of mobile object groups on the basis of the scores for the plurality of mobile object groups.

For example, as illustrated in FIG. 8, the server controller 33 may rank the plurality of mobile object groups in descending order of the scores. Further, for example, the server controller 33 may rank the plurality of mobile object groups in ascending order of the scores. The server controller 33 may rank the mobile object groups using the scores directly, or may rank the mobile object groups using information obtained by performing predetermined calculation processing on the scores. As illustrated in FIG. 8, the server controller 33 may store the ranking of the respective mobile object groups in the server memory 32 in association with the mobile object IDs. The server controller 33 may store the ranking of a new mobile object group in the server memory 32 in association with ranking of the mobile object group every time a score is calculated.

In step S305, the server 30 causes each of the mobile objects 10 to display information in accordance with the ranking of the mobile object group to which the respective mobile objects 10 are affiliated.

Specifically, the server controller 33 transmits an instruction to display the information in accordance with the ranking of the mobile object group to the mobile object 10 via the server communication interface 31 at a predetermined timing. The information in accordance with the ranking of the mobile object group may be information in accordance with the ranking of the mobile object group to which the mobile object 10 of a transmission target is affiliated or may be information in accordance with the ranking of the mobile object group to which the mobile object 10 of the transmission target is not affiliated. For example, in a case in which the mobile object 10 receives an instruction to display the information in accordance with the ranking of the mobile object group to which the mobile object 10 is affiliated, the mobile object 10 can display the information in accordance with the ranking of the mobile object group to which the mobile object 10 is affiliated, on the display 14.

The instruction to display the information in accordance with the ranking of the mobile object group may or may not include the information which is to be displayed by the mobile object 10. For example, it is assumed that the mobile object 10 is affiliated to the mobile object group A illustrated in FIG. 8. The mobile object 10 may store in advance images A1, A2 and A3 which are to be respectively displayed when the ranking of the mobile object group A is the first position, the second position and the third position as the information in accordance with the ranking of the mobile object group A. In such a case, the server controller 33 may transmit only information indicating the ranking of the mobile object group A as the instruction to display the information in accordance with the ranking of the mobile object group A to which the mobile object 10 is affiliated, to the mobile object 10. Meanwhile, in a case in which the mobile object 10 does not store the images A1, A2 and A3, the server controller 33 may transmit the instruction to display the information in accordance with the ranking of the mobile object group A including the images A1, A2 or A3, to the mobile object 10.

In step S306, the server 30 receives a usage reservation which designates the mobile object group.

Specifically, the server controller 33 receives the usage reservation which designates the mobile object group via the server communication interface 31. The server controller 33 may, for example, receive the usage reservation which designates the mobile object group from the terminal apparatus 20 possessed by the user. In a case where the server controller 33 does not receive the usage reservation which designates the mobile object group (step S306: No), the server controller 33 may finish the present processing without executing processing in step S307.

In step S307, the server 30 stores the usage reservation in association with the mobile object 10 affiliated with the mobile object group.

Specifically, in a case where the server controller 33 receives the usage reservation from the terminal apparatus 20, the server controller 33 stores the usage reservation in the server memory 32 in association with the mobile object 10 affiliated with the mobile object group. For example, in a case where the server controller 33 receives the usage reservation including the mobile object group ID, the server controller 33 may select the mobile object 10 which satisfies conditions such as use application and a usage time period included in the usage reservation among the mobile objects 10 which are affiliated to the mobile object group of the mobile object group ID. The server controller 33 may store the usage reservation in the server memory 32 in association with the selected mobile object 10. The server controller 33 may transmit the usage reservation to the selected mobile object 10.

Example Processing for Ranking Mobile Object Groups in the Information Processing System Processing for ranking mobile object groups to be performed in the information processing system 1 will be described below using specific examples. For example, the information processing system 1 may be used in a service in which a plurality of mobile objects 10 are divided into groups which are associated with idols affiliated to an idol group and the idols are ranked on the basis of actual usage of the mobile objects 10. The information processing system 1 causes the respective mobile objects 10 to display images of idols with different rarity levels in accordance with the ranking of the mobile object group to which the mobile objects 10 are affiliated.

As illustrated in FIG. 8, it is assumed that the server 30 performs management so that twelve mobile objects 10 included in the information processing system 1 are respectively affiliated to three mobile object groups A, B and C. The server 30 stores group name, typical images, or the like, associated with the respective three idols affiliated with the idol group as information regarding the three mobile object groups A, B and C. The server 30 further stores images of the idols which are to be respectively displayed in cases in which the ranking of the respective mobile object groups is first position, the second position and the third position as the information in accordance with the ranking of the three mobile object groups A, B and C.

The server 30 transmits an instruction to display the typical images of the idols to the mobile objects 10 respectively affiliated with the three mobile object groups A, B and C as the information indicating the mobile object groups. Thus, for example, the mobile object 10 which is affiliated to the mobile object group A causes the image A to be displayed at the display 14. Thus, a user of the mobile object 10 can select and use the mobile object 10 affiliated with one of the mobile object groups A, B and C.

When the actual usage in accordance with usage by the users is transmitted from the mobile objects 10, the server 30 calculates scores for the mobile object groups A, B and C on the basis of the actual usage received from the mobile objects 10 and ranks the mobile object groups.

In a case in which the mobile object group A is ranked in the first position as a result, the server 30 transmits an instruction to display the image A1 which is to be displayed in cases in which the ranking of the mobile object group A is the first position, to the mobile objects 10 affiliated with the mobile object group A, as the information in accordance with the ranking of the mobile object group. Thus, the satisfaction level of the user of the mobile object 10 who is able to view the image A1 of the idol, whose rarity level is high is increased, and the user's motivation to use the mobile object 10 for maintaining the idol in the first position, is increased.

Further, in a case in which the mobile object group A is ranked in the second position, the server 30 transmits an instruction to display the image A2 which is to be displayed in cases in which the ranking of the mobile object group A is the second position, to the mobile objects 10 affiliated with the mobile object group A, as the information in accordance with the ranking of the mobile object group. Thus, the user's motivation to use the mobile object 10 for raising the ranking of the idol to the first position is further increased by the user of the mobile object 10 being able to view the image A2 of the idol, whose rarity level is lower than that the first position.

Modified Example 1

A modified example of the information processing system 1 according to the present embodiment will be described with reference to FIG. 10 and FIG. 11. According to the present modified example, the server 30 can change the information in accordance with the ranking of the mobile object group to which the mobile object 10 is affiliated, which is to be displayed by the mobile object 10, in accordance with position information for the mobile object 10. Thus, for example, even if the rankings of mobile object groups of the mobile objects 10 are the same, it is possible to display, for example, an image limited to a region in accordance with the positions of the mobile objects 10, so that it is possible to increase the user's motivation to use the mobile object 10.

Operations of the server 30, which are to be realized by each function of the server 30 being controlled by the server controller 33 in the present modified example, will be described with reference to FIG. 10.

In the present modified example, it is assumed that the server 30 stores a plurality of regions. A "region" in the present embodiment may be a geographical area in which the mobile object 10 can move. For example, the region may be a geographical area associated with an administrative district such as a city, a town or a village. Further, for example, the region may be a geographical area such as a circle having a radius of a predetermined distance, centered around a predetermined coordinate or a polygon having sides of a predetermined distance, having a centroid at a predetermined coordinate. For example, as illustrated in FIG. 11, the server memory 32 of the server 30 may store a plurality of regions in association with the mobile object group IDs and may store the information in accordance with the ranking for each region. The information in accordance with the ranking may be, for example, an image of an idol. In FIG. 11, two regions of a region X and a region Y are associated with one mobile object group ID, and one image to be respectively displayed in a case where the ranking of the mobile object group is the first position, the second position and the third position are associated with each of the region X and the region Y.

In step S301 in FIG. 10, the server 30 causes each of the mobile objects 10 to display the information indicating the mobile object group to which each of the mobile objects 10 is affiliated.

In step S302B, the server 30 receives actual usage and position information for a plurality of mobile objects 10.

Specifically, the server controller 33 receives the actual usage and the position information for the mobile objects 10 via the server communication interface 31. The server controller 33 may receive the actual usage and the position information for the mobile object 10 from each of the mobile objects 10. The server controller 33 may receive the actual usage and the position information at frequencies equal to each other or may receive them at different frequencies. In a case where the server controller 33 does not receive the actual usage and the position information for the mobile objects 10 (step S302B: No), the server controller 33 may execute processing in step S306 without performing processing from step S303 to step S305B.

In step S303, the server 30 calculates scores for the respective mobile object groups on the basis of the actual usage.

In step S304, the server 30 ranks a plurality of mobile object groups on the basis of the scores for the plurality of mobile object groups.

In step S305B, the server 30 causes each of the mobile objects 10 to display information in accordance with the ranking of the mobile object group to which the mobile object 10 is affiliated and the position information for the mobile object 10.

Specifically, the server controller 33 compares the position information for the mobile object 10 received in step S302B with a plurality of regions to determine a region in which the position information for the mobile object 10 is included. Further, the server controller 33 selects information in accordance with the ranking of the mobile object group to which the mobile object 10 is affiliated in the region where the mobile object 10 is located, on the basis of the ranking of the mobile object group to which the mobile object 10 is affiliated, generated in step S304, and the region in which the position information for the mobile object 10 is included. The server controller 33 transmits an instruction to display the selected information to the mobile object 10 via the server communication interface 31 at a predetermined timing. The mobile object 10 which receives the instruction can display the information in accordance with the ranking of the mobile object group to which the mobile object 10 is affiliated and the position information for the mobile object 10 on the display 14.

In step S306, the server 30 receives a usage reservation which designates the mobile object group.

In step S307, the server 30 stores the usage reservation in association with the mobile object 10 affiliated with the mobile object group.

Processing for ranking the mobile object groups to be performed by the information processing system 1 in the present modified example will be described below using a specific example. As illustrated in FIG. 11, it is assumed that the server 30 performs management so that twelve mobile objects 10 included in the information processing system 1 are respectively affiliated with three mobile object groups A, B and C. The server 30 stores group name, representative images, or the like, respectively associated with three idols affiliated with an idol group as the information regarding the three mobile object groups A, B and C.

The server 30 stores images of idols which are to be respectively displayed in two regions X and Y in a case in which the ranking of the respective mobile object groups is the first position, the second position and the third position as the information in accordance with the ranking of the three mobile object groups A, B and C.

The mobile objects 10 respectively affiliated with the three mobile object groups A, B and C move in the region X or Y while displaying the images A, B and C which are representative images of the idols as the information indicating the mobile object groups. Thus, the user of the mobile object 10 can select and use the mobile object 10 affiliated with one of the mobile object groups A, B and C.

When the actual usage in accordance with usage by the user and the position information is transmitted from the mobile objects 10, the server 30 calculates scores for the mobile object groups A, B and C on the basis of the actual usage received from the mobile objects 10 and ranks the mobile object groups A, B and C.

It is assumed that the mobile object group A is ranked in first position as a result. In a case in which the server 30 determines that the position information for the mobile object 10 affiliated with the mobile object group A is included in the region X, the server 30 causes the mobile object 10 to display an image AX1 which is to be displayed in the region X in a case where the ranking of the mobile object group A is the first position. Meanwhile, in a case where the server 30 determines that the position information for the mobile object 10 affiliated with the mobile object group A is included in the region Y, the server 30 causes the mobile object 10 to display an image AY1 which is to be displayed in the region Y in a case where the ranking of the mobile object group A is the first position. In this manner, by the information processing system 1 causing the mobile object 10 to display information different for each region, it is possible to increase user's interest in using the mobile object 10.

Modified Example 2

A modified example of the information processing system 1 according to the present embodiment will be described with reference to FIG. 12 and FIG. 13. According to the present modified example, the server 30 can rank the mobile object groups on the basis of the actual usage for the mobile objects 10 in each of a plurality of regions and cause the mobile objects 10 to display information for the mobile object group whose ranking is the first position in each region. Thus, for example, as in an encampment game, if regions where the ranking of the mobile object group is the first position increase, regions where the information associated with the mobile object group is displayed increase, so that the user's interest in using the mobile object 10 is further increased.

Operations of the server 30, which are to be realized by each function of the server 30 being controlled by the server controller 33 in the present modified example, will be described with reference to FIG. 12.

In the present modified example, it is assumed that the server 30 stores a plurality of regions. For example, as illustrated in FIG. 13, the server memory 32 of the server 30 may store the plurality of regions in association with the mobile object group IDs, and may store information to be displayed in a case where the ranking of the mobile object group is the first position for each region as the information in accordance with the ranking. The information in accordance with the ranking may be, for example, an image of an idol. In FIG. 13, two regions of the region X and the region Y are associated with one mobile object group ID, and a score and the ranking of the mobile object group in each of the region X and the region Y are associated.

In step S301 of FIG. 10, the server 30 causes each of the mobile objects 10 to display the information indicating the mobile object group to which they are affiliated.

In step S302C. the server 30 receives actual usage and position information for a plurality of mobile objects 10 in a similar manner to step S302B in modified example 1.

In step S303C, the server 30 calculates scores for the mobile object groups for each region on the basis of the actual usage.

Specifically, the server controller 33 determines a region where the mobile object 10 is used on the basis of information which quantitatively expresses usage of the mobile object 10 by the user included in the actual usage. In a case in which the actual usage of the mobile object 10 is within one region, the server controller 33 may calculate a score for the mobile object group in the region on the basis of the actual usage. In a case in which the actual usage of the mobile object 10 is across a plurality of regions, the server controller 33 may calculate scores for the mobile object group in the respective regions on the basis of the actual usage. As illustrated in FIG. 13, the server controller 33 may store the scores for the respective mobile object groups for each region in the server memory 32 in association with the mobile object IDs.

In step S304C, the server 30 ranks a plurality of mobile object groups for each region on the basis of the scores for the plurality of mobile object groups for each region.

For example, as illustrated in FIG. 13, the server controller 33 may rank the plurality of mobile object groups for each region in descending order of the scores for each region. The server controller 33 may store the ranking of the mobile object groups for each region in the server memory 32 in association with the mobile object IDs. The server controller 33 may rank the mobile object groups for each region and may store the ranking of a new mobile object group in the server memory 32 every time a score is calculated.

In step S305C, the server 30 causes each of the mobile objects 10 to display information in accordance with the ranking of the mobile object group in a region in which the position information for the mobile object 10 is included.

Specifically, the server controller 33 compares the position information for the mobile object 10 received in step S302C with a plurality of regions to determine a region in which the position information for the mobile object 10 is included. The server controller 33 specifies a mobile object group whose ranking is the first position in the determined region. The server controller 33 selects information to be displayed in a case where the ranking of the mobile object group is the first position in the region as information in accordance with the ranking. The server controller 33 transmits an instruction to display the selected information to the mobile object 10 via the server communication interface 31 at a predetermined timing. The mobile object 10 which receives the instruction can display the information in accordance with the ranking of the mobile object group in the region in which the position information for the mobile object 10 is included, that is, the information for the mobile object group whose ranking is the first position in the region where the mobile object 10 is located, at the display 14.

In step S306, the server 30 receives a usage reservation which designates the mobile object group.

In step S307, the server 30 stores the usage reservation in association with the mobile objects 10 affiliated with the mobile object group.

Processing for ranking the mobile object groups to be performed in the information processing system 1 in the present modified example will be described below using a specific example. As illustrated in FIG. 13, it is assumed that the server 30 performs management so that twelve mobile objects 10 included in the information processing system 1 are respectively affiliated with three mobile object groups A, B and C. The server 30 stores group name, representative images, or the like, respectively associated with three idols affiliated with an idol group as information regarding the three mobile object group A, B and C.

The server 30 stores images of idols which are to be displayed in a case in which the ranking of the mobile object group is the first position in each of two regions X and Y, as information in accordance with the ranking of the three mobile object groups A, B and C.

The mobile objects 10 respectively affiliated with the three mobile object groups A, B and C move in the region X or Y while displaying images A, B and C which are representative images of the idols as the information indicating the mobile object groups. Thus, the user of the mobile object 10 can select and use the mobile object 10 which is affiliated to one of the mobile object groups A, B and C.

When the actual usage in accordance with usage by the users and the position information are transmitted from the mobile objects 10, the server 30 calculates scores for the mobile object groups A, B and C in each of the regions X and Y on the basis of the actual usage received from the mobile objects 10 and ranks the mobile object groups A, B and C.

It is assumed that, as a result, the server 30 determines that the ranking of mobile object group A is the first position in the region X and the ranking of mobile object group C is the first position in the region Y. In such a case, the server 30 causes the mobile objects 10 located in the region X to display an image A1 which is to be displayed in a case in which the ranking of the mobile object group A is the first position in the region X as the information in accordance with the ranking of the mobile object group, regardless of the mobile object group to which the mobile objects 10 are affiliated. Further, the server 30 causes the mobile objects 10 located in the region Y to display an image C1 which is to be displayed in a case where the rank group of the mobile object group C is the first position in the region Y as the information in accordance with the ranking of the mobile object group, regardless of the mobile object group to which the mobile objects 10 are affiliated. Thus, region X is occupied by mobile objects 10 which display the image of the mobile object group A, and region Y is occupied by mobile objects 10 which display the image of the mobile object group C.

For example, in a case where usage of the mobile object group B increases in the region X and the ranking of the mobile object group B becomes the first position, the server 30 causes the mobile objects 10 located in region X to display an image B1 which is to be displayed in a case where the ranking of the mobile object group B is in the first position in region X as the information in accordance with the ranking of the mobile object group, regardless of the mobile object group to which the mobile object 10 is affiliated. Thus, the region X is occupied by mobile objects 10 which display the image of the mobile object group B. In this manner, the information processing system 1 can provide an encampment game to the user of the mobile objects 10. The motivation of the user to use the mobile objects 10, for example, increases in regions where the mobile objects 10 display the image of the idol of whom the user is a fan.

As described above, the information processing apparatus which is the server 30 according to the present embodiment includes a communication interface which is the server communication interface 31, and a controller which is the server controller 33. The communication interface receives actual usage for a plurality of mobile objects 10 which are affiliated with one of a plurality of mobile object groups. The controller ranks the plurality of mobile object groups on the basis of the actual usage. According to such a configuration, the information processing apparatus can rank information associated with the plurality of mobile object groups in accordance with the actual usage for the mobile objects 10. The ranking of the information generated by the information processing apparatus can be used to motivate the users of the mobile objects 10 to use the mobile objects 10 more. Therefore, the information processing apparatus can encourage the users to use the mobile objects 10.

In the information processing apparatus according to the present embodiment, the controller can cause each of the mobile objects 10 to display information indicating the mobile object group to which each of the mobile objects 10 is affiliated. According to such a configuration, it becomes easier to recognize the mobile object group to which the mobile object 10 is affiliated.

In the information processing apparatus according to the present embodiment, the controller can cause each of the mobile objects 10 to display different information in accordance with the ranking of the mobile object group to which each of the mobile objects 10 is affiliated. According to such a configuration, information to be displayed by the mobile object 10 changes in accordance with relative actual usage of the mobile object 10 by the user, so that the user's interest in using the mobile object 10 is increased.

In the information processing apparatus according to the present embodiment, the actual usage may include at least one of information regarding a travel distance and information regarding a usage time period. According to such a configuration, the information processing apparatus can motivate the users of the mobile objects 10 to increase the travel distance or the usage time period of the mobile objects 10.

In the information processing apparatus according to the present embodiment, the controller can calculate a total number of times that the mobile objects 10 which are affiliated with each of the mobile object groups have been used on the basis of the actual usage, and can rank the plurality of mobile object groups on the basis of the total number of times that they have been used. According to such a configuration, even in a case in which information included in the actual usage transmitted from the respective mobile objects 10 are different, the information processing apparatus can convert the information into the number of times of usage and rank the mobile object groups. Thus, scalability of the information processing system 1 is improved.

In the information processing apparatus according to the present embodiment, the communication interface can receive a usage reservation which designates a mobile object group, and the controller can associate the usage reservation with a mobile object 10 which is affiliated with the mobile object group. According to such a configuration, the user only has to select a mobile object group to reserve a mobile object 10 which is affiliated with the mobile object group. Therefore, it becomes easier for the user to reserve the mobile object 10.

In the information processing apparatus according to the present embodiment, the communication interface can receive position information for a plurality of mobile objects 10, and the controller can cause each of the mobile objects 10 to display information in accordance with a ranking of the mobile object group to which each of the mobile objects 10 is affiliated and position information for each of the mobile objects 10. According to such a configuration, information to be displayed by the mobile object 10 changes in accordance with the position of the mobile object 10, so that the user's interest in using the mobile object 10 is further increased.

In the information processing apparatus according to the present embodiment, the communication interface can receive position information for a plurality of mobile objects 10, and the controller can rank a plurality of mobile object groups in each of a plurality of regions and cause each of the mobile objects 10 to display information in accordance with the ranking of a plurality of the mobile object groups in a region in which position information for each of the mobile objects 10 is included. According to such a configuration, information to be displayed by the mobile object 10 changes in accordance with the position of the mobile object 10, so that the user's interest in using the mobile object 10 is increased.

A control method for the information processing apparatus according to the present embodiment includes a step of receiving by the information processing apparatus actual usage of a plurality of mobile objects 10 which are affiliated with one of a plurality of mobile object groups, and a step of ranking by the information processing apparatus the plurality of mobile object groups on the basis of the actual usage. According to such a configuration, the information processing apparatus can rank information associated with the plurality of mobile object groups in accordance with the actual usage for the mobile objects 10. The ranking of the information generated by the information processing apparatus can be used to motivate the users of the mobile objects 10 to use the mobile objects 10 more. Therefore, the information processing apparatus can encourage the users to use the mobile objects 10.

According to the information processing system 1 according to the present embodiment, the information processing system 1 includes a plurality of mobile objects 10 which are affiliated with one of a plurality of mobile object groups, and a server 30 which can perform communication with the plurality of mobile objects 10. The respective mobile objects 10 transmit the actual usage of the respective mobile objects 10 to the server 30. The server 30 ranks the plurality of mobile object groups on the basis of the actual usage. According to such a configuration, the information processing system 1 can rank information associated with the plurality of mobile object groups in accordance with the actual usage for the mobile objects 10. The ranking of the information generated by the information processing system 1 can be used to motivate the users of the mobile objects 10 to use the mobile objects 10 more. Therefore, the information processing system 1 can encourage the users to use the mobile objects 10.

While the present disclosure has been described on the basis of the drawings and embodiments, it is to be noted that it is easy for a person skilled in the art to make various modifications and corrections on the basis of the present disclosure. Therefore, it is to be noted that these modifications and corrections are included in the scope of the present disclosure. For example, it is possible to rearrange functions, or the like, included in the respective means, the respective steps, or the like, without producing logical inconsistency, and it is possible to combine a plurality of means, steps, or the like, to make one means, step, or the like, or divide the means, steps, or the like.

For example, in the above-described embodiment, all or part of functions or processing described as the functions or processing of the server 30 may be realized as functions or processing of the mobile object 10 or the terminal apparatus 20. Specifically, it is also possible to store a program which describes processing content for realizing the respective functions of the server 30 according to the embodiment in the memory 13 such as a memory of the mobile object 10 and read out and execute the program by the controller 16 such as a processor of the mobile object 10. In a similar manner, it is also possible to store a program which describes processing content for realizing the respective functions of the server 30 according to the embodiment in the terminal memory 22 such as a memory of the terminal apparatus 20 and read out and execute the program by the terminal controller 25 such as a processor of the terminal apparatus 20.

Further, for example, it is also possible to employ a configuration where a general-purpose information processing apparatus such as a smartphone or a computer is caused to function as the mobile object 10, the terminal apparatus 20 or the server 30 according to the above-described embodiment. Specifically, a program which describes processing content for realizing the respective functions of the mobile object 10, or the like, according to the embodiment is stored in a memory of the information processing apparatus, and the program is read out and executed by a processor of the information processing apparatus. Therefore, the disclosure according to the present embodiment can be realized as a program which can be executed by a processor. For example, in a case where a general-purpose information processing apparatus is caused to function as the mobile object 10, the disclosure according to the present embodiment can be realized by an information processing apparatus having the above-described configuration and functions as the configuration and the functions of the mobile object 10 being provided at the mobile object 10.

Further, for example, while, in the above-described embodiments, examples have been described in which the information processing system 1 ranks the plurality of mobile object groups on the basis of the actual usage of the mobile objects 10, the present disclosure is not limited to this. The information processing system 1 may further rank users on the basis of actual usage of the mobile objects 10 which area affiliated with the group for each mobile object group, in addition to ranking of the plurality of mobile object groups on the basis of the actual usage of the mobile objects 10. According to such a configuration, the information processing system 1 can relatively evaluate a degree to which the user contributes to the ranking of the respective mobile object groups. Information regarding the degree to which the user contributes to the ranking of the mobile object groups, generated by the information processing system 1 can be used to motivate the users to use the mobile objects 10 more often.

The invention claimed is:

1. An information processing system comprising:
a plurality of mobile objects each affiliated with one of a plurality of mobile object groups, with at least one mobile object being grouped with each mobile object group, each mobile object including:
a display provided facing outward from or inward to the mobile object,
a position module that determines a position of the mobile object, and
a controller that measures actual usage of the mobile object, the actual usage being measured based on the position of the mobile object over time or based on a time period in which the mobile object is used;
a server comprising:
a database that stores at least one image per mobile object group, the at least one image being associated with one of the plurality of mobile object groups;
a communication interface configured to communicate through a network with the plurality of mobile objects; and
a server controller configured to:
receive the actual usage for each of the plurality of mobile objects, via the communication interface, from the plurality of mobile objects;
receive the position of each of the plurality of mobile objects, via the communication interface, from the plurality of mobile objects;
determine regions where the plurality of mobile objects are used based on the received position information;
rank the plurality of mobile object groups based on the received actual usage for each of the determined regions, thereby determining a ranking position of each one of the plurality of mobile object groups for each of the determined regions;
retrieve, as an image in accordance with the determined ranking position of each one of the plurality of mobile object groups, an image associated with a mobile object group the ranking position of which is determined to be a first place position, from the database, for each of the determined regions; and
transmit the retrieved image, via the communication interface, to the at least one mobile object affiliated to each one of the plurality of mobile object groups for each of the determined regions, thereby causing the display provided facing outward from or inward to the at least one mobile object, which includes mobile objects affiliated to a mobile object group the ranking position of which is determined to be a second place position or lower, to display the image associated with the mobile object group the ranking position of which is determined to be the first place position for each of the determined regions.

2. The information processing system according to claim 1,
wherein the server controller is configured to cause each of the mobile objects to display information indicating the mobile object group to which each of the mobile objects is affiliated.

3. The information processing system according to claim 1,
wherein the server controller is configured to calculate a total number of times that mobile objects affiliated with each of the mobile object groups have been used based on the actual usage and rank the plurality of mobile object groups based on the total number of times.

4. The information processing system according to claim 1,
wherein the communication interface is configured to receive a usage reservation which designates a mobile object group in the plurality of mobile object groups, and
the server controller is configured to associate the usage reservation with the mobile objects which are affiliated with the mobile object group.

5. The information processing system according to claim 1, wherein
the server controller is configured to cause each of the mobile objects to display information in accordance with the ranking position of the mobile object group to which each of the mobile objects are affiliated and the position of each of the mobile objects.

6. A control method for an information processing system, the control method comprising:
providing a plurality of mobile objects each affiliated with one of a plurality of mobile object groups, with at least one mobile object being grouped with each mobile object group, each mobile object including: a display provided facing outward from or inward to the mobile object, a position module that determines a position of the mobile object, and a controller that measures actual usage of the mobile object, the actual usage being measured based on the position of the mobile object over time or based on a time period in which the mobile object is used;
providing a server that includes a database that stores at least one image per mobile object group, the at least one image being associated with one of the plurality of mobile object groups, a communication interface configured to communicate through a network with the plurality of mobile objects, and a server controller; and
executing control so as to cause the server controller to:
receive the actual usage for each of the plurality of mobile objects, via the communication interface, from the plurality of mobile objects;
receive the position of each of the plurality of mobile objects, via the communication interface, from the plurality of mobile objects;

determine regions where the plurality of mobile objects are used based on the received position information;

rank the plurality of mobile object groups based on the received actual usage for each of the determined regions, thereby determining a ranking position of each one of the plurality of mobile object groups for each of the determined regions;

retrieve, as an image in accordance with the determined ranking position of each one of the plurality of mobile object groups, an image associated with a mobile object group the ranking position of which is determined to be a first place position, from the database, for each of the determined regions; and transmit the retrieved image, via the communication interface, to the at least one mobile object affiliated to each one of the plurality of mobile object groups for each of the determined regions, thereby causing the display provided facing outward from or inward to the at least one mobile object, which includes mobile objects affiliated to a mobile object group the ranking position of which is determined to be a second place position or lower, to display the image associated with the mobile object group the ranking position of which is determined to be the first place position for each of the determined regions.

* * * * *